United States Patent
Le Roy et al.

(10) Patent No.: US 6,941,809 B2
(45) Date of Patent: Sep. 13, 2005

(54) METHOD FOR TEMPERATURE-COMPENSATED ACCELEROMETER MEASUREMENT, WITH AT LEAST A DEVICE COMPRISING TWO VIBRATING RESONATORS

(75) Inventors: Jean-Claude Le Roy, Cergy le Haut (FR); Paul Featonby, Asnieres (FR)

(73) Assignee: Sagem SA, Paris (FR)

( * ) Notice: Subject to any disclaimer, the term of this patent is extended or adjusted under 35 U.S.C. 154(b) by 23 days.

(21) Appl. No.: 10/496,512

(22) PCT Filed: Nov. 13, 2002

(86) PCT No.: PCT/FR02/03881

§ 371 (c)(1),
(2), (4) Date: May 21, 2004

(87) PCT Pub. No.: WO03/044538

PCT Pub. Date: May 30, 2003

(65) Prior Publication Data

US 2004/0255671 A1 Dec. 23, 2004

(30) Foreign Application Priority Data

Nov. 23, 2001 (FR) .............................. 01 15172

(51) Int. Cl.[7] .............................. G01P 15/10
(52) U.S. Cl. ...................... 73/497; 73/514.29; 702/141
(58) Field of Search .............................. 73/497, 514.29, 73/702, 862.59; 702/141

(56) References Cited

U.S. PATENT DOCUMENTS

| 5,379,639 A | 1/1995 | Hulsing, II et al. |
| 6,230,565 B1 * | 5/2001 | Foote ...................... 73/514.29 |
| 6,386,035 B2 | 5/2002 | Janiaud et al. |

FOREIGN PATENT DOCUMENTS

| EP | 0 551 152 | 7/1993 |
| FR | 2 813 122 | 2/2002 |

* cited by examiner

Primary Examiner—John E. Chapman
(74) Attorney, Agent, or Firm—Douglas E. Jackson; Stites & Harbison PLLC (57) ABSTRACT

The invention concerns a temperature-compensated accelerator measurement using two vibrating resonators whereof the frequencies ($f_1$, $f_2$) are measured, then used for determining (18, 19) the most probable temperature value (T) based on the sum $f_1+f_2$ and on a pre-established correlation (14) between the temperature and the sum $f_1+f_2$ and finally based on the determination (20) of the amount $f_1-f_2$ of the weighted temperature value, calculating (21) the temperature compensated value of the acceleration ($\gamma$).

15 Claims, 7 Drawing Sheets

FIG. 8

METHOD FOR TEMPERATURE-COMPENSATED ACCELEROMETER MEASUREMENT, WITH AT LEAST A DEVICE COMPRISING TWO VIBRATING RESONATORS

FIELD OF THE INVENTION

The present invention relates to the field of accelerometric measurements, and more specifically it relates to improvements made in the field of accelerometric measurements performed with devices having two vibrating resonators working respectively in stress states of opposite signs (in general in tension and compression).

DESCRIPTION OF THE PRIOR ART

Thus, the use is already known of devices having two vibrating resonators comprising two respective vibrating beams, parallel and identical, one working in tension and the other in compression, to detect a component of acceleration (see for example documents FR 00 10675 and FR-A-2 784 752 in the name of the Applicant; FR-A-2 685 964, FR-A-2 784 752). As illustrated by way of example in FIG. 1 of the appended drawings, such an accelerometer device 1 comprises, in a very schematic manner, the two miniature accelerometers $Acc_1$, $Acc_2$ with nonslaved pendular masses. Each of them comprises a pendulum mass (or seismic mass) M urged toward a rest position by a link with a stand S which consists of a vibrating beam or blade P (the means of vibrational excitation and of detection of the vibration not being illustrated) and of a hinge-forming member C. The two beams $P_1$, $P_2$ are identical and parallel and are disposed in a reverse position with respect to each other, so that, under the action of the two respective identical seismic masses $M_1$, $M_2$, one $P_1$ of the beams works in compression and the other $P_2$ of the beams works in tension. The two individual accelerometers $Acc_1$, $Acc_2$ are together enclosed in a leaktight box B in which an intense vacuum is generally established.

Figure 1:
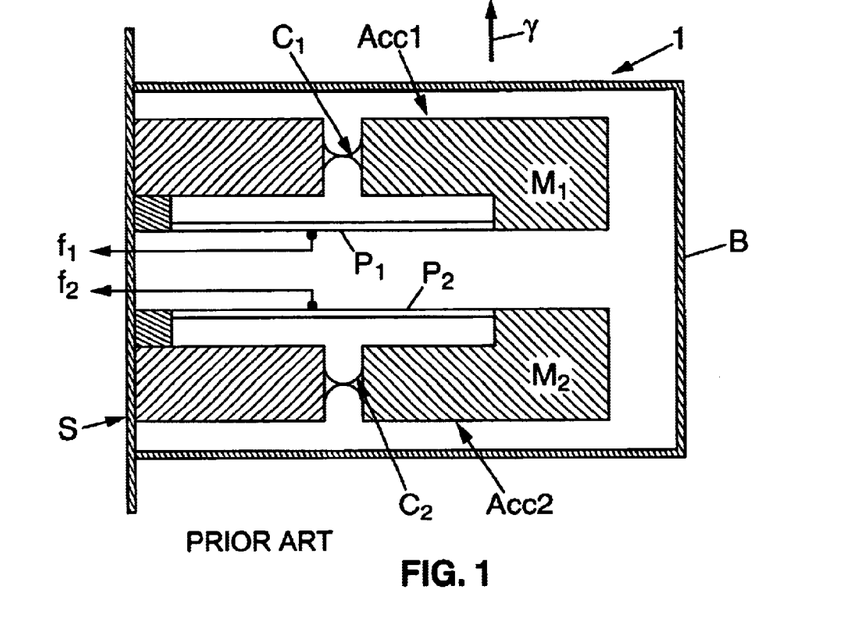
FIG. 1 is a very schematic representation of a prior art accelerometer device having two vibrating resonators.

When the accelerometer device 1 is subjected to an acceleration γ directed along the sensitive axis, that is to say for example perpendicular to the span of the vibrating beams $P_1$, $P_2$, it results in a variation of the resonant frequencies of the beams related to the acceleration applied and to the stress (compression or tension) undergone by the beams:

$$f_1 = f_{01} + k_{11}\gamma - k_{12}\gamma^2 + k_{13}\gamma^3$$

$$f_2 = f_{02} - k_{21}\gamma - k_{22}\gamma^2 + k_{23}\gamma^3$$

where $f_{01}$ and $f_{02}$ are the resonant frequencies of the two respective beams $P_1$ and $P_2$ in the absence of acceleration, and the coefficients k are constants.

This type of accelerometer device has several benefits, in particular by reason of its low bulk (flat structure whose thickness may be less than 1 mm for in-plane dimensions of the order of a centimeter) and of its simple and economical fabrication by methods of chemical etching on a crystal wafer, generally piezoelectric, but possibly silicon, with possibility of simultaneous collective fabrication of several accelerometers on one and the same wafer of material.

However, in the type of accelerometer device considered having double vibrating resonator, the resonant frequencies of the vibrating beams $P_1$, $P_2$ depend not only on the acceleration γ to which the device is subjected, but also on the temperature T of the beams. One is therefore led to supplement the above equations with a polynomial in T:

$$f_1 = f_{01} + \prod_1^1 (\gamma^n) + \prod_1^2 (T^n)$$

$$f_2 = f_{02} + \prod_2^1 (\gamma^n) + \prod_2^2 (T^n)$$

A simple calculation of the value of the acceleration γ as a function of the measured frequency $f_1$ and/or $f_2$ requires knowledge of the temperature of the beams $P_1$, $P_2$. However, it is not possible, in practice, to dispose an appropriate sensor, in the box B, in immediate proximity to the vibrating beams, nor to dispose a thermal sensor in actual contact with the vibrating beams $P_1$, $P_2$ (which would constitute the ideal solution for obtaining an exact value of the temperature) by reason of the perturbation that the presence of this sensor would cause on the vibration of the beams. Finally, recourse to a method of thermoelectric measurement would be liable to perturb the temperature of the beam itself.

An object of the invention is therefore to propose a method of calculating the value of the acceleration, temperature-compensated, on the basis of the measurements of the frequencies $f_1$, $f_2$ of the two vibrating beams $P_1$, $P_2$, without the need for recourse to any thermal detection means disposed in contact with the vibrating beams.

SUMMARY OF THE INVENTION

For these purposes, the invention proposes a method for accelerometer measurement by determination of the value, compensated as a function of temperature, of an acceleration on the basis of measurements of frequencies made on one accelerometer device having two vibrating resonators of similar geometries working respectively in stress states of opposite signs, which process is characterized in that according to the invention it comprises the steps which follow:

- the device being subjected to a component of acceleration, the frequencies $f_1$ and $f_2$ of the respective vibrations of the two vibrating resonators are determined, given that the respective values of these two frequencies are influenced by the acceleration and by the temperature;
- the sum $f_1+f_2$ of the two measured frequencies is determined, given that this sum is influenced by the temperature;
- on the basis of a pre-established correlation of the variation of the quantity $f_1+f_2$ as a function of temperature, the possible temperature values $T_i$ corresponding to the value of the abovedetermined sum $f_1+f_2$ are plotted;
- the value ($G_{mes}$) of a magnitude representative of the temperature in proximity to the device having two vibrating resonators is measured;
- with the aid of a previously established transfer function H, an estimated value $G_{estimated}=H(G_{mes})$ of abovesaid magnitude is determined on the basis of said measured value $G_{mes}$, this estimated magnitude being representative of the estimated temperature of the vibrating resonators;
- on the basis of the estimated value $G_{estimated}$ of said magnitude and of the possible temperature values $T_i$, the probability $P(T_i)$ that the value of the temperature of the resonators is $T_i$, is determined, for each value $T_i$;
- a weighted value T of the temperature of the vibrating resonators is calculated $T=\Sigma P(T_i) \times T_i$;
- finally on the basis of one and/or the measured frequencies $f_1$ and $f_2$ and of the weighted value T of the temperature, the temperature-compensated value of the acceleration undergone by the accelerometer device is determined.

By virtue of the provisions of the invention, it is possible to take account, in the calculation of the value of the acceleration γ, of a temperature value T, or of a magnitude representative of this temperature (for example a magnitude varying linearly as a function of temperature) in the vicinity of the resonators—and hence intrinsically inexact since it is not the value of the temperature of the resonators—and on the basis of a choice, involving a probability calculation, between several possible values of the temperature.

In practice, the two vibrating resonators cannot be strictly identical from the geometrical point of view: it is then desirable to take account of this geometrical difference by correcting the sum $f_1+f_2$ with an error term estimated on the basis of the acceleration calculated during the previous calculation cycle, if it exists.

Again in practice, the implementation of the method of the invention with a polynomial $\pi(T^n)$ of the high order n turns out to be complex, by reason of the high number n of mathematical solutions, that is to say of the number n of possible values of temperature $T_i$ corresponding to a given value of the frequency $f_1+f_2$. This also results in a longer calculation of the probabilities $P(T_i)$ and of the value $T=\Sigma P(T_i) \times T_i$. A value T of sufficient accuracy is obtained, in a concrete manner, with a polynomial of order 2: $\pi(T^2)$ or of order 3: $\pi(T^3)$.

The mathematical relation between the frequency, the acceleration and the temperature may be written $$f=f_0+\pi(\gamma^3)+a(T-T_o)^2$$

in the case of a polynomial in T of order 2 and $$f=f_0+\pi(\gamma^3)+a(T-T_o)^2+b(T-T_o)^3$$

in the case of a polynomial in T of order 3.

In practice, the terms in $\gamma^2$ and $\gamma^3$ are small and may be neglected compared with the term in γ. The two equations above may then be written in respectively simplified form:

$$f=f_0+k\gamma+a(T-T_o)^2$$

and $f=f_0+k\gamma+a(T-T_o)^2+b(T-T_o)^3$

The curve corresponding to the function f(T) is a parabola or a cubic, respectively, whose local extremum (situated in the bracket of the implementation temperatures) corresponds to the reversal temperature (or "turnover") temperature $T_o$. Thus, with each value f of the frequency may be associated two possible values of temperature $T_a$ and $T_b$, just one of which is the exact temperature of the vibrating resonator. In the case of a third-order polynomial, the third solution is spurious with respect to the temperature domain considered and may be rejected outright. The determination of the temperature of the resonators calls upon a probabilistic estimation and consists in associating, with the sum $f_1+f_2$, two values $T_a$ and $T_b$, in calculating the probability $P(T_a)$ that the temperature of the resonators is $T_a$ and the probability $P(T_b)$ that the temperature of the resonators is $T_b$, then in calculating a weighted value of the temperature of the resonators $$T=P(T_a) \times T_a+P(T_b) \times T_b.$$

In the case of accelerometric and/or gyroscopic measurements in several axes (in practice in two or three axes of a reference system) with the aid of several respective accelerometric and/or gyroscopic and/or gyrometric vibrating devices (inertial sensor block), provision may advantageously be made for a value of the temperature-compensated acceleration, in each axis, according to one or other of the processes set forth above and, in respect of the determination of one at least of the values of the temperature-compensated acceleration, for the weighted value of temperature determined for the vibrating device associated with this axis together with at least one weighted value of temperature determined for at least one vibrating device associated with at least one other axis to be used as weighted temperature value.

Such an implementation is most particularly beneficial in the case where all the vibrating resonators of the accelerometric and/or gyroscopic and/or gyrometric devices are machined from one and the same block of crystal.

BRIEF DESCRIPTION OF THE DRAWINGS

The invention will be better understood on reading the detailed description which follows of certain embodiments given by way of nonlimiting examples. In this description, reference is made to the appended drawings in which.

DETAILED DESCRIPTION OF THE INVENTION

The invention is aimed at determining a value, corrected as a function of temperature, of the acceleration γ undergone by an accelerometer device having two vibrating resonators of similar geometries, working respectively in stress states of opposite signs. In the example illustrated, the two resonators respectively comprise two parallel and substantially identical vibrating beams working respectively in particular in tension and in compression, but possibly being combinable with at least one other state of stress such as flexion and/or torsion. In the example illustrated, the acceleration γ or the component of the acceleration which is measured is directed substantially perpendicularly to the beams.

The frequencies of vibration of the two beams may be written, as a function of temperature T and of acceleration γ:

$$f_1 = f_{01} + \prod_1^1 (\gamma^n) + \prod_1^2 (T^n)$$

$$f_2 = f_{02} + \prod_2^1 (\gamma^n) + \prod_2^2 (T^n)$$

According to the invention, the frequencies $f_1$ and $f_2$ of the vibration of the two vibrating beams are determined, and then the sum $f_1+f_2$ is calculated.

On the basis of a pre-established and stored correlation between the values of frequency and the corresponding values of temperature $f \rightarrow \pi(Tn)$, the n possible values $T_i$ of temperature are determined, for the frequency $f1+f2$.

An evaluation of the estimated temperature of the resonators is then carried out. For this purpose, the value $G_{mes}$ of a magnitude representative of the temperature in proximity to the device having two vibrating resonators is measured; then, with the aid of a previously established transfer function H, an estimated value $G_{estimated}=H(G_{mes})$ of abovesaid magnitude $G_{mes}$ is determined, this estimated magnitude being representative of the estimated temperature of the vibrating resonators. On the basis of the estimated value $G_{estimated}$ of said representative magnitude of the estimated temperature of the resonators and of the possible temperature values $T_i$, the probabilities $P(T_i)$ that each possible temperature value $T_i$ is the exact value of the temperature of the resonators are determined.

A simple way of implementing the above provisions consists in performing a temperature measurement directly, in which case the magnitude G representative of the temperature is the temperature itself. It is in this context that what follows is set forth.

A temperature sensor that delivers a measured temperature value $T_{mes}$ is disposed in immediate proximity to the box of the accelerometer device and either inside, or more readily outside the latter. By invoking a transfer function H predetermined through earlier trials, an estimated temperature of the vibrating resonators can be evaluated $T_{estimated}=H(T_{mes})$.

The probability $P(T_i)$ that the temperature of the resonators is $T_i$ is determined on the basis of the values $T_{estimated}$ and $T_i$, for each value $T_i$. Then a weighted value T of the temperature is determined $$T=\Sigma P(T_i) \cdot T_i$$

that is taken as temperature value of the two resonators.

Thereafter, knowing the temperature T, it is possible to calculate the value of the acceleration $\gamma$ on the basis of one and/or more measured frequencies $f_1$ and $f_2$.

The implementation of a polynomial $\pi(Tn)$ of high order n entails complex and lengthy calculations, and makes it difficult to establish the correlation $f \rightarrow \pi(Tn)$ by reason of the high number of possible values $T_i$ associated with each frequency value.

Accuracy that is acceptable in practice may be obtained with a polynomial of order 2: $\pi(T^2)$, or preferably of order 3: $\pi(T^3)$.

The vibration frequency is expressed, as a function of acceleration and temperature, by the relation $$f=f_0+\pi(\gamma^3)+a(T-T_o)^2$$

in the case of a polynomial in T of order 2 or by the relation $$f=f_0+\pi(\gamma^3)+a(T-T_o)^2+b(T-T_o)^3$$

in the case of a polynomial in T of order 3.

The terms in $\gamma^2$ and $\gamma^3$ being small in practice may be neglected compared with the term in $\gamma$ so that the two aforesaid relations may be written in simplified form, respectively:

$$f=f_0+k\gamma+a(T-T_o)^2$$

and $f=f_0+k\gamma+a(T-T_o)^2+b(T-T_o)^3$

Figure 3A:
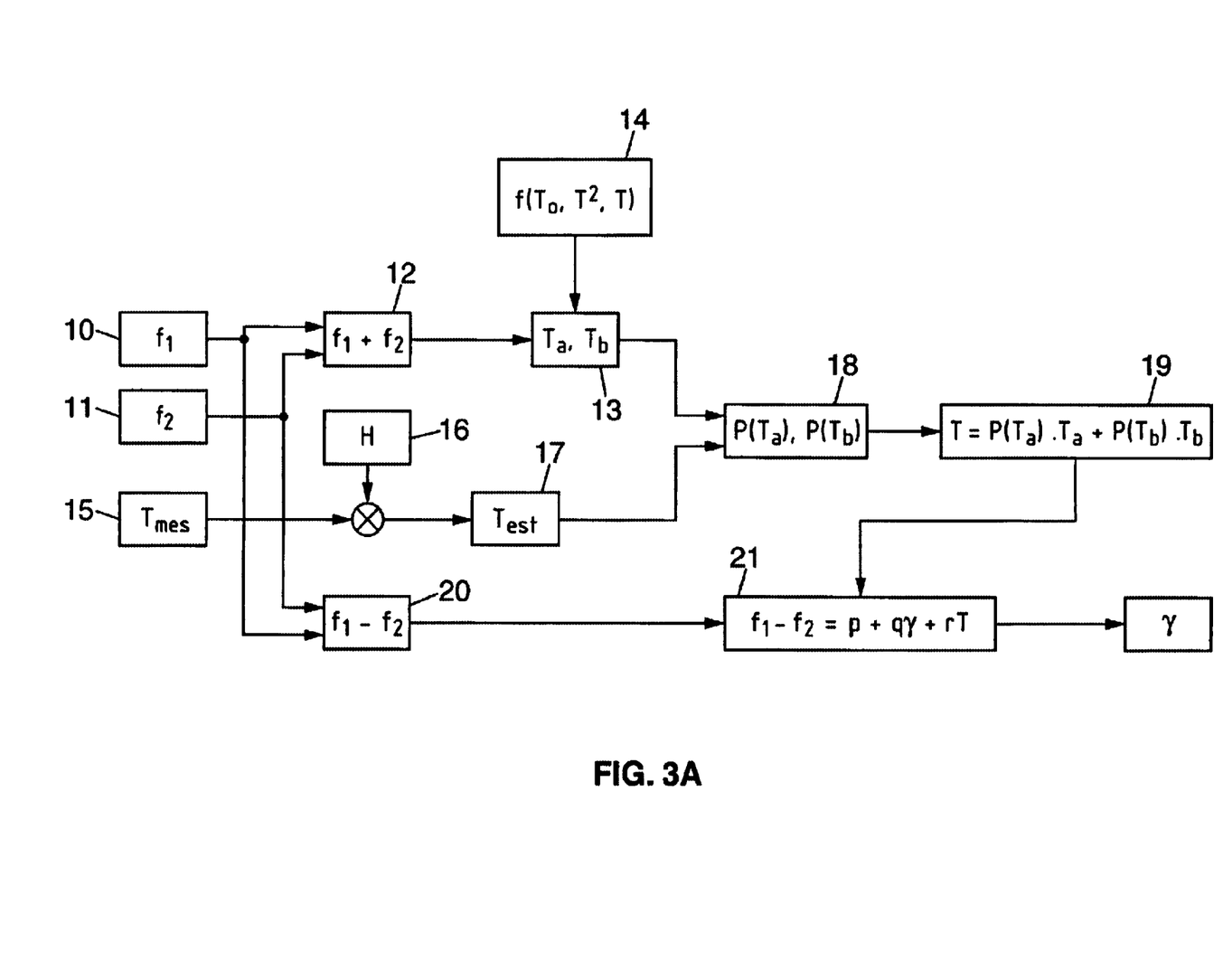
FIGS. 3A and 3B are block diagrams respectively illustrating two preferred implementations of the method in accordance with the invention.
Figure 3B:
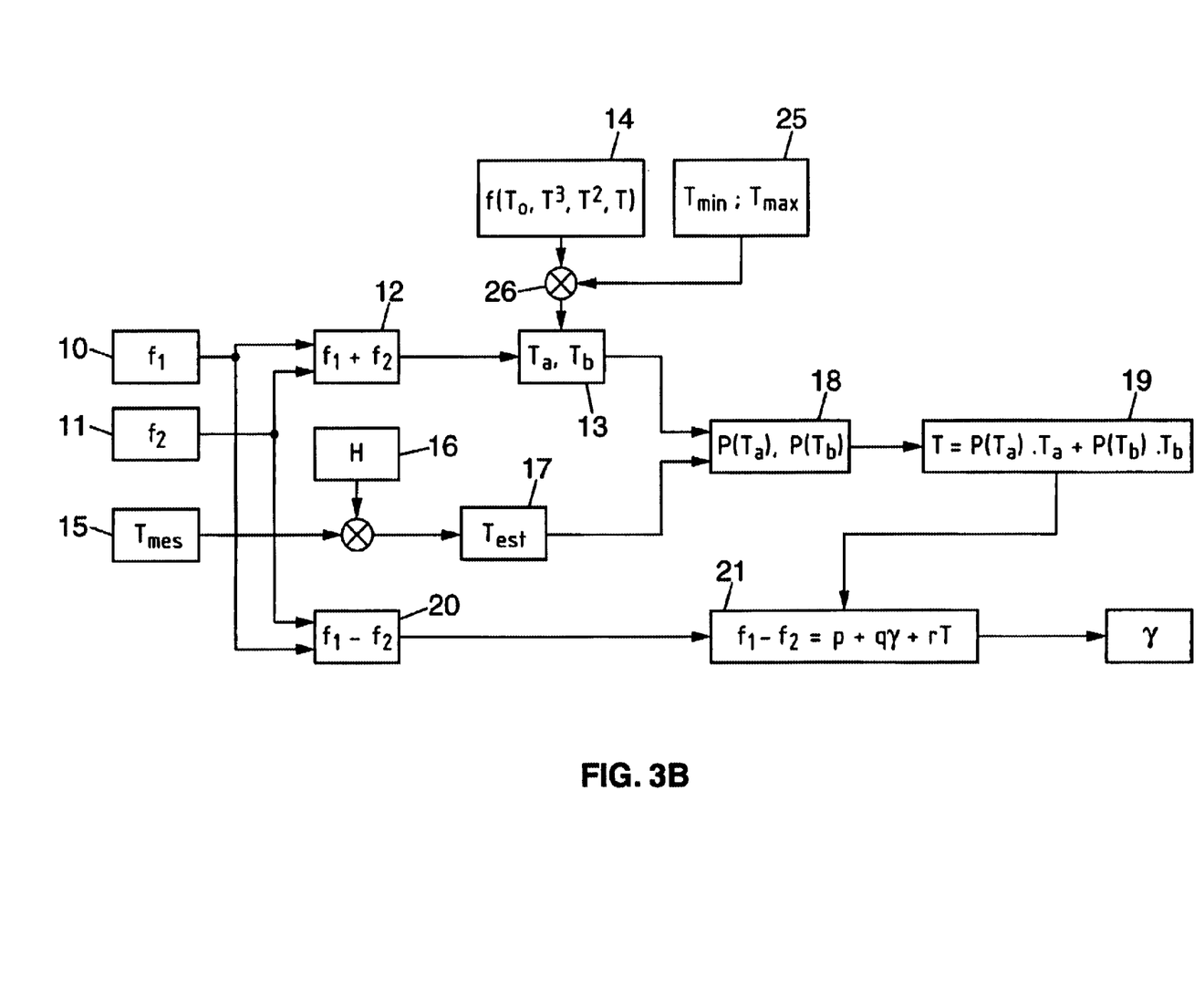

As represented schematically in FIG. 3, the frequencies $f_1$ and $f_2$ of the two vibrating resonators $P_1$ and $P_2$ subjected to an acceleration $\gamma$ are measured at 10 and 11, given that the frequencies $f_1$ and $f_2$ are dependent on $\gamma$ and on the temperature T, the case of a polynomial of order 2 in T:

$$f_1=f_{01}+k_1\gamma+a_1(T-T_{o1})^2$$

$$f_2=f_{02}-k_2\gamma+a_2(T-T_{o2})^2$$

(where $T_{o1}$ and $T_{o2}$ are the respective reversal temperatures (or "turnover" temperatures)), or else, in the case of a polynomial of order 3 in T:

$$f_1=f_{01}+k_1\gamma+a_1(T-T_{o1})^2+b_1(T-T_{o1})^3$$

$$f_2=f_{02}-k_2\gamma+a_2(T-T_{o2})^2+b_2(T-T_{o2})^3$$

It is noted that the sum $f_1+f_2$ is independent of the acceleration $\gamma$ if $k_1=k_2$ and depends only on the temperature. Moreover, the difference $f_1-f_2$ depends essentially on the acceleration $\gamma$ if the curvature terms $a_1$ and $a_2$, as well as the reversal values $T_{o1}$ and $T_{o2}$ are close to one another, respectively (the terms in $T^2$ and $T^3$ dropping out). The method in accordance with the invention and which is set forth hereinbelow with regard to FIG. 3A (case of a polynomial of order 2 in T) and FIG. 3B (case of a polynomial of order 3 in T) is based on the exploitation of the two values $f_1+f_2$ and $f_1-f_2$.

The sum $f_1+f_2$ is determined at 12 on the basis of the measurements of the frequency $f_1$ at 10 and of the frequency $f_2$ at 11.

The two possible values of temperature $T_a$, $T_b$ corresponding to the value $f_1+f_2$ emanating from the measurements $f_1$ and $f_2$ are plotted at 13 on the basis of a pre-established correlation, held in memory at 14, between the frequency and the temperature of the resonators (polynomial in $T^3$ and/or $T^2$ and T). In the case of a polynomial of order 2 in T (case illustrated in FIG. 3A), the two sought-after values $T_a$ and $T_b$ are the two solutions of the second-degree equation in T. In the case of a polynomial of order 3 in T (case illustrated in FIG. 3B), the third-degree equation in T has three solutions, one of which, however, is spurious with respect to the temperature domain considered and should be rejected; it is thus advisable to hold in memory at 25 (FIG. 3B) limit values, for example $T_{min}$; $T_{max}$, defining the temperature domain and to compare at 26 the three solutions of the third-degree equation with said limit values so as to eliminate the spurious solution and retain only the two appropriate solutions $T_a$, $T_b$.

The two temperature values $T_a$, $T_b$ are the two possible values that may correspond to the frequency $f_1+f_2$, but just one of the two temperature values is exact in practice.

To perform as accurate an approximation as possible of the exact temperature of the resonators (the two resonators are assumed to be at the same temperature), a thermal sensor CTH is disposed in immediate proximity to the resonators. This thermal sensor may be disposed inside the box B (as shown dashed in FIG. 2), but it may also be disposed (since this is a simpler implementation) outside this box as illustrated in solid line in FIG. 2.

This thermal sensor CTH provides at 15 (FIGS. 3A and 3B) a measured value of temperature $T_{mes}$, which value $T_{mes}$ is only an approximate value, and not exact, of the temperature of the resonators $P_1$, $P_2$.

Prior to the measurement, a transfer function H is established experimentally between the exact values of temperature of the resonators $P_1$, $P_2$ situated inside the box B and the temperature values measured, simultaneously, by the sensor CTH outside the box B. The transfer function H is held in memory at 16.

To fix matters, the transfer function H may be a simple function of second or third order, such as, with $H(p)=T(p)/T_{CHT}(p)$ $$H(p)=1/(1+\alpha p)^2$$

or $H(p)=1/[(1+\alpha_1 p)(1+\alpha_2 p)(1+\alpha_3 p)]$ in which p is the Laplace operator and $\alpha$, $\alpha_1$, $\alpha_2$, $\alpha_3$ are constants depending on the structure of the temperature sensor and on the time for the heat to propagate between the vibrating beams situated inside the box B and the temperature sensor CTH situated outside this box.

Thus, with the temperature $T_{mes}$ measured outside the box B, it is possible to associate at 17, through the transfer function H, an estimated value $T_{est}$ of the temperature of the beams $P_1$, $P_2$ inside the box B.

Then, on the basis of the values $T_a$, $T_b$ and $T_{est}$, probability calculations are performed at 18 giving the probability $P(T_a)$ that the temperature $T_a$ is the temperature of the beams $P_1$, $P_2$ and the probability $P(T_b)$ at the temperature $T_b$ is the temperature of the beams $P_1$, $P_2$.

To fix matters, the probabilities $P(T_a)$ and $P(T_b)$ may be calculated in the following manner:

$$P(T_a)=g(T_a)/(g(T_a)+g(T_b))$$

$$P(T_b)=g(T_b)/(g(T_a)+g(T_b))$$

with $$g(T_a)=1/(|T_a-T_{est}|)$$

$$g(T_b)=1/(|T_b-T_{est}|)$$

The calculations could also be performed with the following functions:

$$g(T_a)=exp(-\alpha \cdot |T_a-T_{est}|)$$

$$g(T_b)=exp(-\alpha \cdot |T_b-T_{est}|)$$

in which $\alpha$ is a constant.

The formulae indicated here have the advantage of being simple and of leading to fast calculations. However, if necessary, the person skilled in the art may have recourse to formulae that are more complex and more accurate, but also entail lengthier calculations.

Then, at 19, is calculated a value T of the temperature which is a weighting of the possible values $T_a$ and $T_b$ afforded the previously calculated weighting coefficients $P(T_a)$ and $P(T_b)$:

$$T=P(T_a) \cdot T_a + P(T_b) \cdot T_b.$$

A value T of temperature of the resonators which is statistically the most likely is thus defined.

Finally, the temperature-compensated value of the acceleration $\gamma$ undergone by the accelerometer device is determined on the basis of one of the measured frequencies $f_1$ or $f_2$, or on the basis of the two measured frequencies $f_1$ and $f_2$, and of the weighted value T of the temperature that has just been determined at 19.

In practice, the quantity $f_1-f_2$ is calculated at 20. It is known that, in the case of the polynomial of order 2 in T, the mathematical expression therefor is:

$$f_1-f_2=(f_{o1}-f_{o2})+(k_1+k_2)\gamma+a_1(T-T_{o1})^2-a_2(T-T_{o2})$$

Stated otherwise, this expression is of the type:

$$f_1-f_2=p+q\gamma+r\,T+sT^2$$

On the basis of the value T of the temperature determined at 19, it is then easy to calculate, at 21, the value $\gamma$ from T and from $f_1-f_2$.

In the case of a polynomial of order 3 in T, the mathematical expression for $f_1-f_2$ is more complex, but can nevertheless be determined and also allows calculation of the value of $\gamma$ on the basis of the calculation of the value $f_1-f_2$.

A temperature-compensated value of the acceleration $\gamma$ is ultimately obtained at 22.

The correlation between the frequency and the temperature ($T^3$ and/or $T^2$, T), held in memory at 14, may be stored in the form of a mathematical equation of second or third degree in T whose coefficients are pre-established by prior experimental measurements performed on the accelerometer device 1. The two possible values $T_a$ and $T_b$ are then calculated by solving this equation for each given value of $f_1+f_2$. An array giving, for all the possible values $f_1+f_2$, the two corresponding possible values $T_a$, $T_b$ may also be held in memory at 14.

In the same way, the transfer function H held in memory at 16 may be stored either in the form of an algebraic relation $T_{est}=H(T_{mes})$, or in the form of an array of pre-established data giving, for each value $T_{mes}$, the associated value $T_{est}$.

Experience has shown that the curve that mathematically conveys the relation between the frequency and the temperature ($T^3$ and/or $T^2$, T) was prone to variation over time, this variation being conveyed essentially as a drift in the frequency for a given temperature, the shape of the curve $f(T^3$ and/or $T^2$, T) remaining substantially unchanged.

Figure 4:
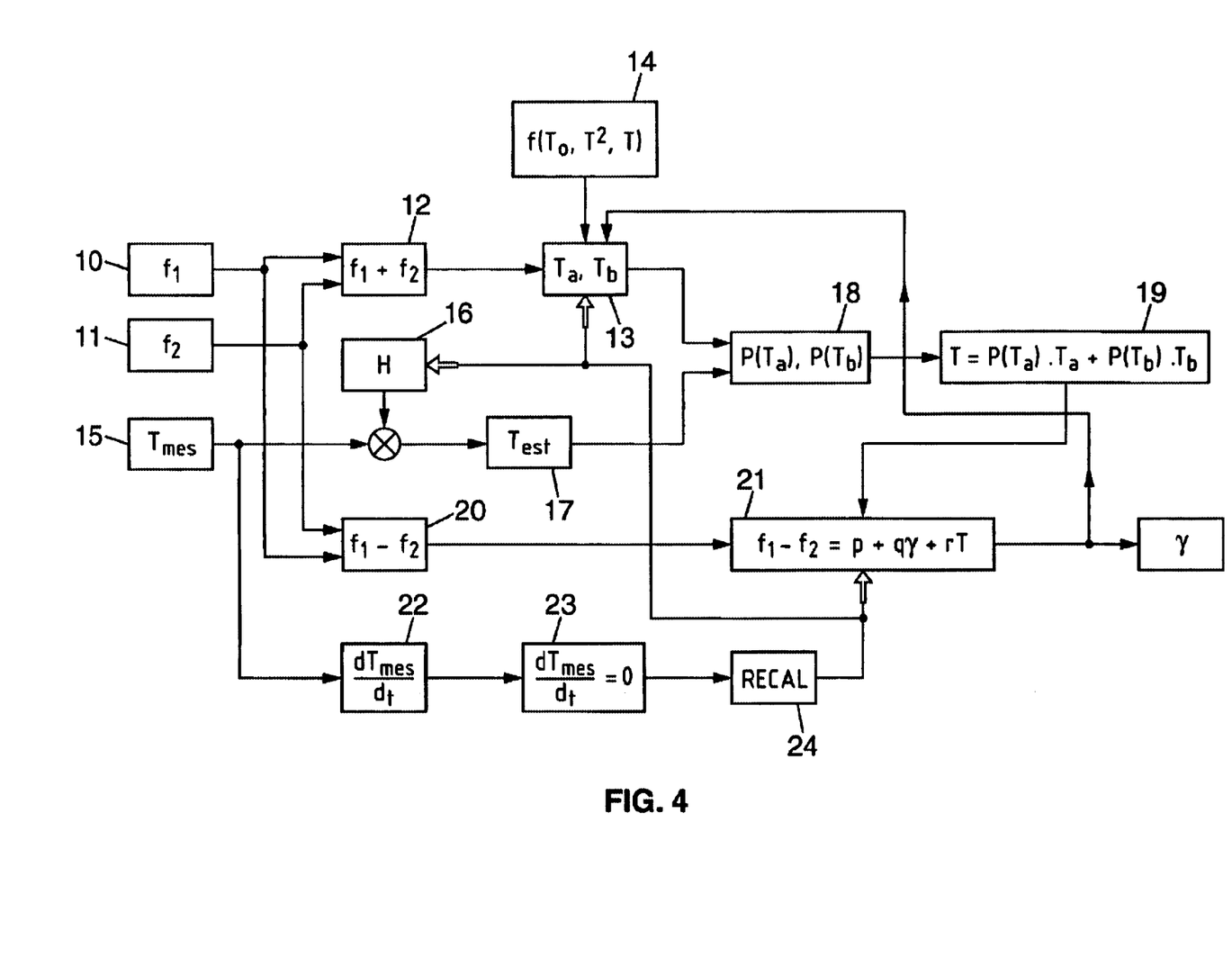
FIG. 4 is a block diagram illustrating an improvement of the method of FIG. 3A.

To obtain a method of calculating the acceleration $\gamma$ which remains accurate over time, it is very desirable to provide for a recalibration as illustrated in FIG. 4 of the appended drawings.

With this aim, the steps described previously are supplemented with the following steps appearing in FIG. 4 (which is derived more precisely from FIG. 3A). The derivative with respect to time $dT_{mes}/dt$ is calculated at 22 on the basis of the measured value of the temperature $T_{mes}$. If, at 23, this drift is detected to be zero or almost zero, then a recalibration procedure RECAL is instigated at 24, able to act on the transfer function held in memory at 16, on the calculation/selection at 13 of the possible values of temperature $T_a$, $T_b$, and on the calculation 21 of the value $f_1-f_2=p+q\,\gamma+r\,T$ leading, in a simple way, to the determination of the acceleration $\gamma$.

Finally, it will be noted that the acceleration $\gamma$ is calculated iteratively, by successive calculation passes, and that each calculation pass takes into account the value of the acceleration found at the conclusion of the previous calculation pass, in particular for the compensation of the sum $f_1+f_2$ mentioned above when $k_1 \neq k_2$.

In practice, several vibrating devices may be grouped together to provide accelerometric and/or gyrometric or gyroscopic information in two or three reference axes (for example inertial sensor block), all these vibrating devices calling individually upon a temperature measurement for the determination of the compensated values of the vibration frequencies.

According to the invention, the temperature-compensated accelerometric and/or gyroscopic and/or gyrometric measurement, performed for each device having two vibrating resonators, takes into account not only its own weighted temperature value, but also at least certain weighted temperatures predetermined for other vibrating devices so as to obtain an interpolated frequency value related to at least a certain number of the measured temperatures.

Figure 2:
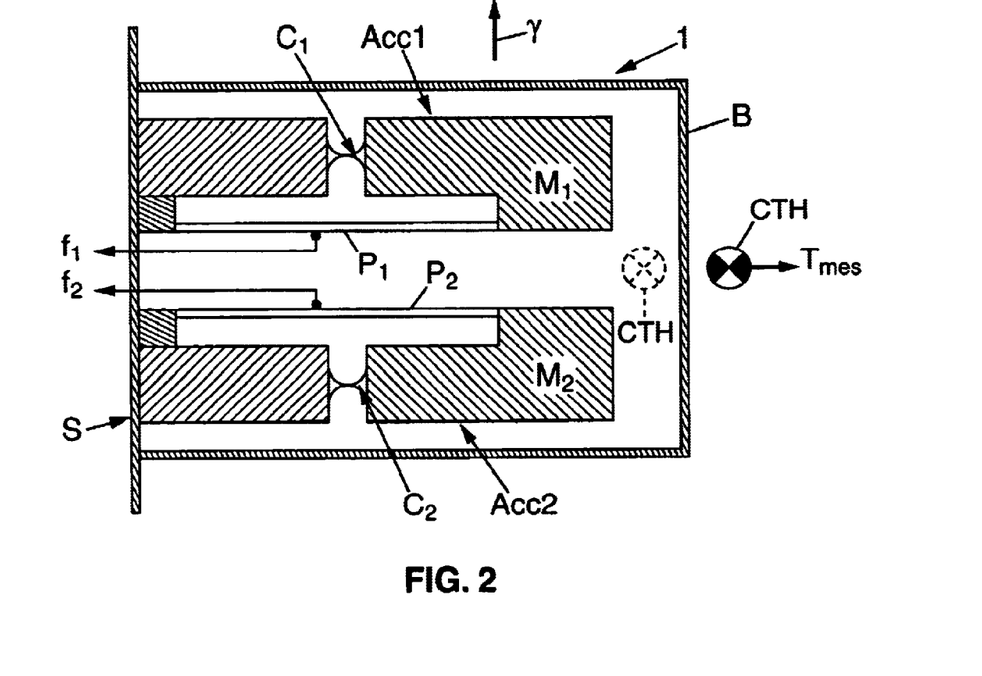
FIG. 2 is a very schematic representation of an accelerometer device having two vibrating resonators and arranged in accordance with the invention.
Figure 5:
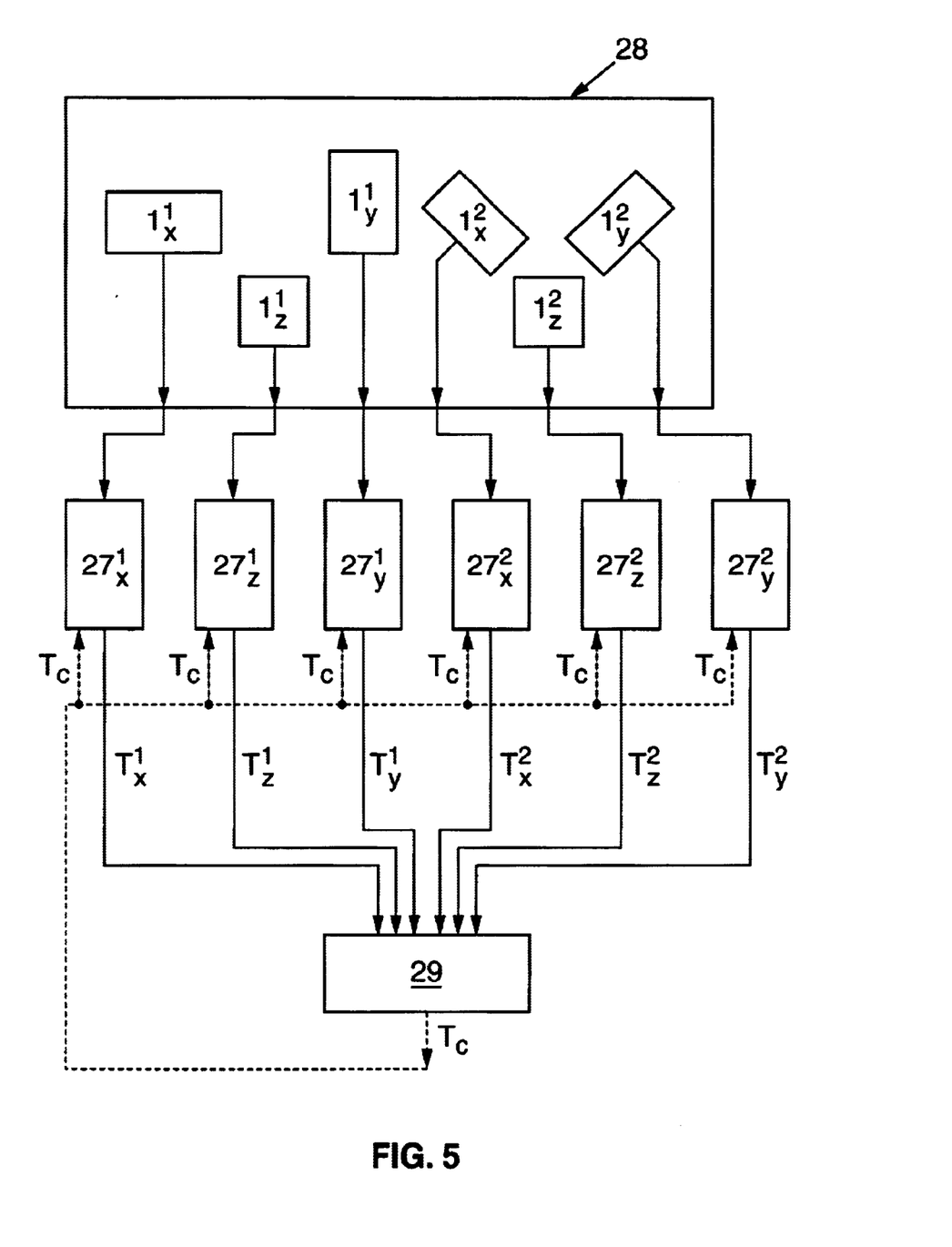
FIG. 5 is a block diagram illustrating in a simplified manner an exemplary inertial sensor arrangement implementing the provisions of the invention.

By way of example, represented very schematically in FIG. 5 is an inertial sensor 28 grouping together three vibrating devices for accelerometric measurements in three axes x, y, z of a reference frame, each vibrating device possibly being of the type illustrated in FIG. 2 and being referenced $1^1_x$, $1^1_y$ and $1^1_z$ respectively, as well as three vibrating devices for gyroscopic measurements with respect to the three axes x, y, z of the reference frame, each vibrating device possibly being of the type illustrated in FIG. 2 and being referenced $1^2_x$, $1^2_y$ and $1^2_z$ respectively.

Figures 6, 7:
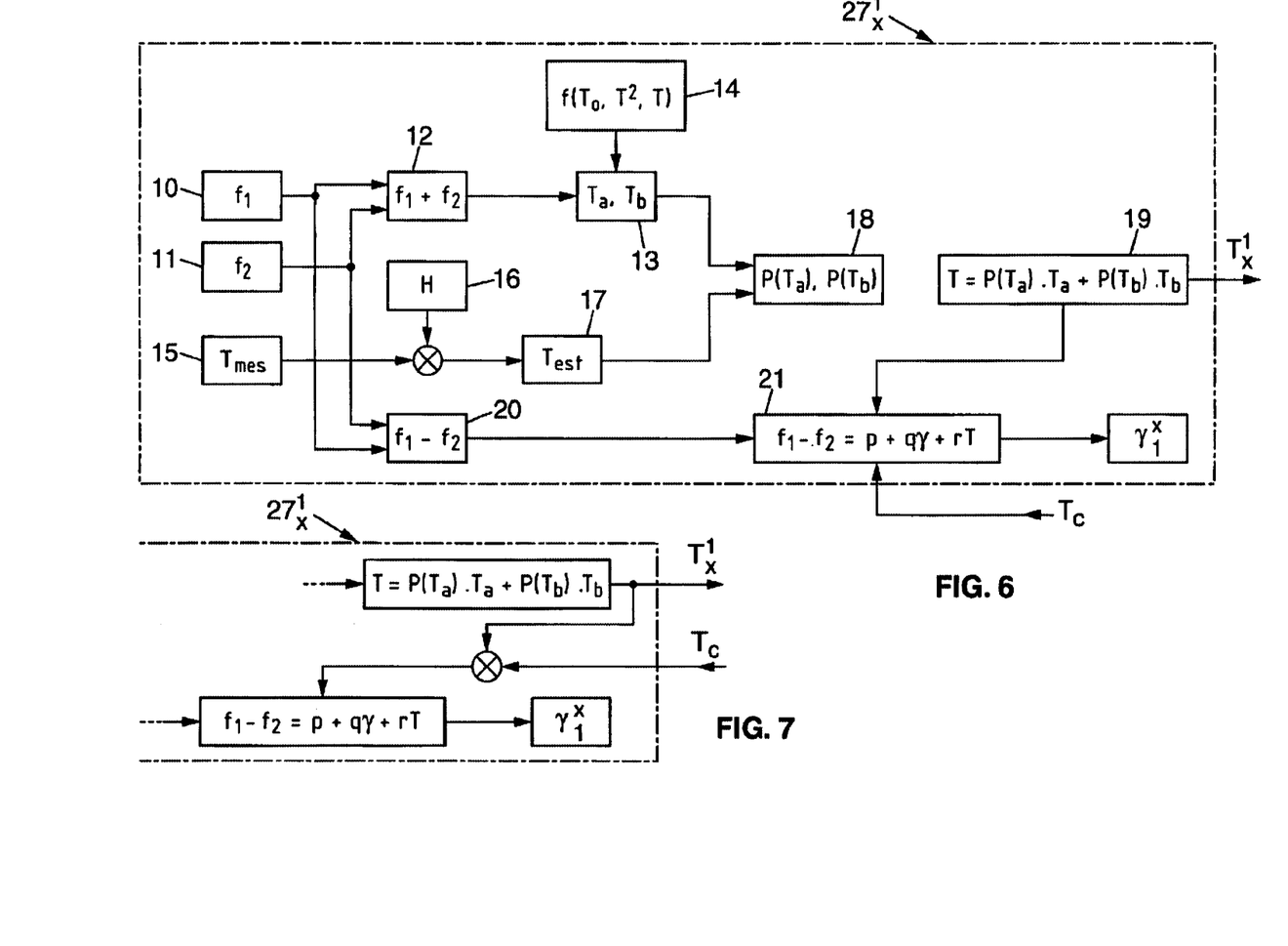
FIG. 6 is a block diagram, mimicking that of FIG. 3A, detailing a functional part of the inertial sensor of FIG. 5.
FIG. 7 is a block diagram illustrating a variant embodiment of a portion of the functional part of FIG. 6.

With each aforesaid vibrating device is associated an information processing unit that receives the information $f_1$, $f_2$ and $T_{mes}$ provided by each device. As illustrated in FIG. 6, each unit 27 is arranged (by way of example) in accordance with the representation given in FIG. 3A. FIG. 6 shows, by way of example, the unit $27^1_x$ associated with the vibrating device $1^1_x$, it being understood that the other units associated respectively with the other vibrating devices are identical to it.

All the weighted temperature values determined by all the units 27, $T^1_x$, $T^1_y$, $T^1_z$, $T^2_x$, $T^2_y$, $T^2_z$ are sent to a correlation device 29 which, on the basis of a pre- established correlation (for example calculation of the mean), delivers a correlated value of temperature $T_c$, which is thereafter delivered to each unit 27.

In the unit 27, the correlated value $T_c$ may then be used directly at 21 to calculate, from $f_1-f_2$, the value of the component of acceleration ($\gamma^1_x$ in FIG. 6).

It is also conceivable, as illustrated in FIG. 7 which shows only a part of the unit $27^1_x$ for the correlated value of temperature $T_c$ to be combined, according to a pre-established law, at 30, with the weighted value $T^1_x$ the resulting value being used for the calculation of the component $\gamma^1_x$ from the value $f_1-f_2$.

Of course, numerous variants of temperature correlation are conceivable, for example: correlation in respect of the temperatures of the accelerometric vibrating devices alone and correlation in respect of the temperatures of the gyroscopic vibrating devices alone; cross-correlation between the temperatures of the accelerometric and gyroscopic devices; etc.

An economic advantage may be obtained when all the vibrating devices are machined from one single block of crystal or "wafer". The vibrating devices are then situated in immediate proximity to one another and there is no longer any need to assign a temperature sensor to each of them: according to the configuration of mutual layout of the devices, a single temperature sensor disposed centrally may suffice, or at the very least two temperature sensors may be envisaged, one associated with the vibrating devices for accelerometric measurements and the other with the vibrating devices for gyroscopic or gyrometric measurements. A gain in dimension in respect of the substrate and a saving as regards the information processing capacity is thus achieved.

It is in particular in the case of the implementation of several adjacently located vibrating devices that it may be appropriate to process a magnitude G representative of the temperature without calling upon the temperature itself. Such a case may arise for example when the device 1 having two vibrating resonators of frequency $f_1$ and $f_2$ is supplemented with an adjacently adjoining vibrating device such as a gyroscopic resonator of the so-called "bowl" type, whose resonant frequency varies linearly as a function of temperature and may be written f=mt+n where m and n are constants. It is then understood that measuring the frequency f of this vibrating device provides a temperature indication which, to within a constant, is equivalent to a direct measurement of the temperature with the aid of a temperature sensor.

Hence, the processing of aforesaid magnitude G(T), if the latter varies in a simple manner as a function of temperature, makes it possible to proceed with the method of accelerometric measurement according to the invention without it being necessary to implement an actual temperature sensor.

Figure 8:
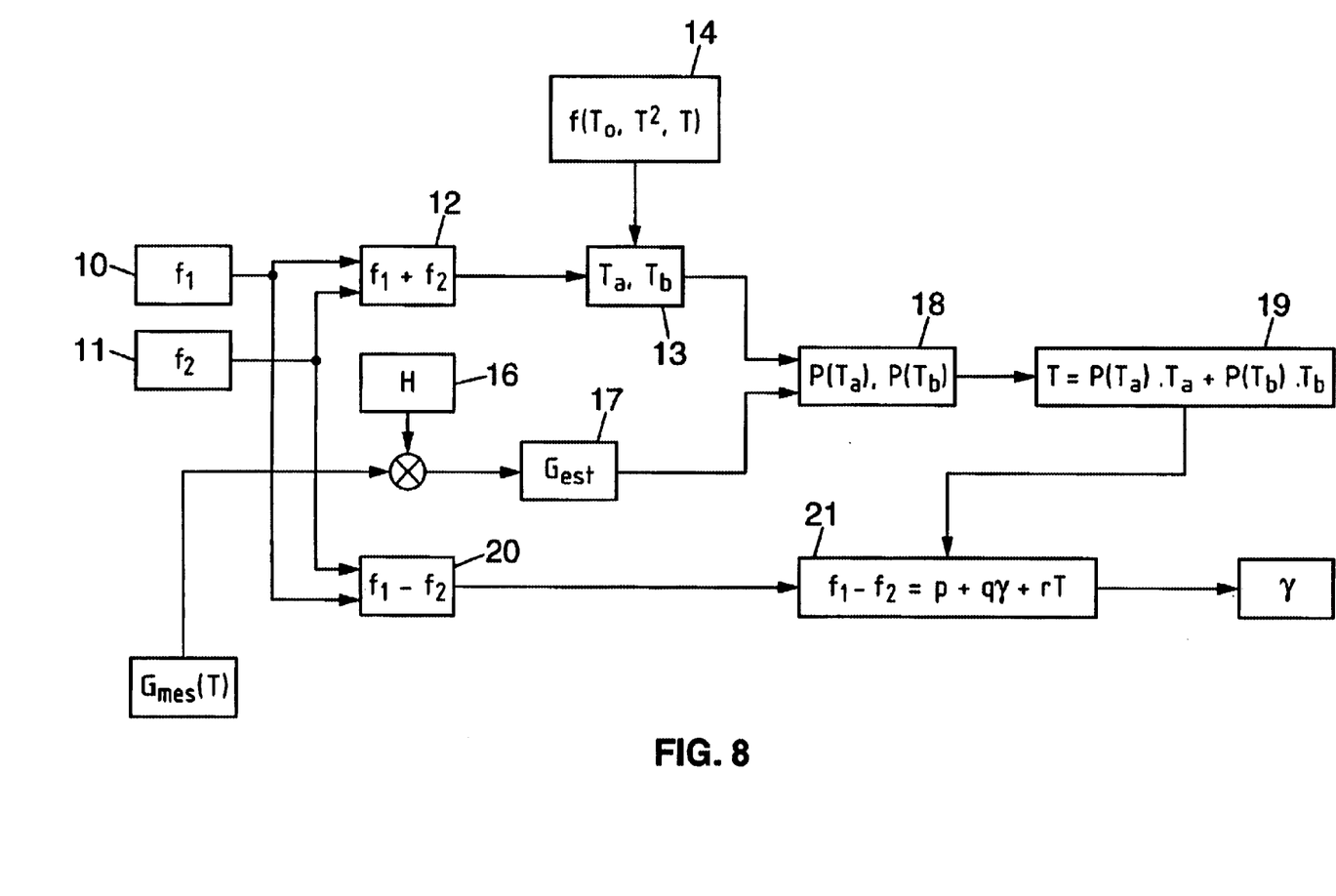
FIG. 8 is a block diagram, mimicking that of FIG. 3A, illustrating yet another variant embodiment.

It is an arrangement of this type that is illustrated in FIG. 8, the diagram of which mimics that of FIG. 3A. At 15 is measured the value $G_{mes}$ of a magnitude G(T) in particular in a vibrating device adjacent to the device 1 having two vibrating resonators of frequency $f_1$ and $f_2$, said magnitude G(T) thus being representative of the temperature in proximity to said vibrating device 1. Then, with the aid of a transfer function H previously established at 16, an estimated value $G_{estimated}=H(G_{mes})$ of the abovementioned magnitude G(T) is determined, the estimated value $G_{estimated}$ being representative of the estimated temperature of the vibrating resonators of frequency $f_1$ and $f_2$. It is this value $G_{estimated}$ that is used thereafter, in conjunction with the values $T_a$, $T_b$, to determine the probabilities $P(T_a)$ and $P(T_b)$ mentioned above, without in fact involving the value of the estimated temperature $T_{estimated}$.

Such a solution has the benefit of avoiding the implementation of one or more temperature sensors, this being advantageous from the economic standpoint. Furthermore, the eliminating of one or more hardware components in an inertial sensor block is always particularly welcome by reason of the gain of space and of bulk thus obtained which goes hand in hand with the search for ever more compact inertial sensor blocks.

What is claimed is:

1. A method for accelerometer measurement by determination of the value, compensated as a function of temperature, of an acceleration on the basis of determinations of frequencies made on at least one accelerometer device having two vibrating resonators of similar geometries working respectively in stress states of opposite signs, characterized in that it comprises the steps which follow:

the device being subjected to a component of acceleration (γ), the frequencies $f_1$ (at 10) and $f_2$ (at 11) of the respective vibrations of the two vibrating resonators are determined, given that the respective values of these two frequencies are influenced by the acceleration (γ) and by the temperature (T);

the sum $f_1+f_2$ of the two determined frequencies is determined (at 12), given that this sum is influenced by the temperature;

on the basis of a pre-established correlation of the variation of the quantity $f_1+f_2$ as a function of temperature (at 14), the possible temperature values $T_i$ corresponding to the value of the above determined sum $f_1+f_2$ are plotted (at 13);

the value ($G_{mes}$) of a magnitude representative of the temperature in proximity to the device having two vibrating resonators is measured;

with the aid of a previously established transfer function H, an estimated value $G_{estimated}=H(G_{mes})$ of above said magnitude is determined on the basis of said measured value ($G_{mes}$), this estimated magnitude being representative of the estimated temperature of the vibrating resonators;

on the basis of the estimated value ($G_{estimated}$) of said magnitude and of the possible temperature values ($T_i$), the probabilities $P(T_i)$ that each possible value ($T_i$) is the exact value of the temperature of the resonators is determined (at 18), for each possible value ($T_i$);

a weighted value T of the temperature of the vibrating resonators is calculated (at 19) $T=\Sigma P(T_i)\times T_i$; and on the basis of one or more determined frequencies $f_1$ and $f_2$ and of the weighted value T of the temperature, the temperature-compensated value of the acceleration undergone by the accelerometer device is determined (at 21).

2. The method as claimed in claim 1, characterized in that the sum of the frequencies ($f_1+f_2$) is corrected, so as to take account of geometrical differences between the two vibrating resonators, with an error term estimated on the basis of the acceleration calculated during the previous calculation cycle, if it exists.

3. The method as claimed in claim 1, characterized in that the influence of the temperature on the value of the vibration of each vibrating resonator is conveyed by a polynomial of order 2: $\Sigma(T^2)$ or by a polynomial of order 3: $\Sigma(T^3)$, and in that, in above said series of steps of the method, the two possible temperature values ($T_a$, $T_b$) corresponding to the value of the above determined sum of the frequencies ($f_1+f_2$) are plotted (at 13) on the basis of the pre-established (at 14, 25, 26) correlation of the variation of the sum of the measured frequencies ($f_1+f_2$) as a function of temperature; and the probability ($P(T_a)$) that the temperature of the resonators is one of these temperatures ($T_a$) and the probability ($P(T_b)$) that the temperature of the resonators is the other of these temperatures ($T_b$) are determined (at 18) on the basis of the estimated value ($G_{estimated}$) of said magnitude (at 17) and of the two possible temperature values ($T_a$, $T_b$), then a weighted value of the temperature is calculated (at 19)

$T=P(T_a)\cdot T_a+P(T_b)\cdot T_b.$

4. The method as claimed in claim 3, characterized in that the pre-established correlation is a mathematical function of second or third degree, held in memory (at 14), representing the variation of the frequencies as a function of the temperature established for the relevant accelerometer device having two vibrating resonators.

5. The method as claimed in claim 3, characterized in that the pre-established correlation is a correspondence table held in memory (at 14), giving, for each value of the frequency ($f_1+f_2$), the two possible values ($T_a$, $T_b$) of the temperature.

6. The method as claimed in claim 1, characterized in that the transfer function (H) is a mathematical function held in memory (at 16) and established experimentally for the relevant accelerometer device having two vibrating beams.

7. The method as claimed in claim 1, characterized in that the transfer function (H) is a table held in memory (at 16) and giving a pre-established correspondence between each measured value ($G_{mes}$) and an estimated value ($G_{estimated}$).

8. The method as claimed in claim 1, characterized in that a readjustment is performed (at 22 to 24) on the transfer function (H), on the selection of the possible temperature values ($T_i$) and on the final calculation when a drift is noted in the curve of the correlation between frequency and temperature.

9. The method as claimed in claim 1, characterized in that the frequencies ($f_1$, $f_2$) of the respective vibrations of the two vibrating resonators are measured.

10. A method of accelerometric and/or gyroscopic and/or gyrometric measurements in several axes with the aid of several respective accelerometric and/or gyroscopic and/or gyrometric vibrating devices, characterized in that, in each axis, a value of the temperature-compensated acceleration is determined according to claim 1, and in that, for the determination of one at least of the values of the temperature-compensated acceleration, the weighted value of temperature determined for the vibrating device associated with this axis together with at least one weighted value of temperature determined for at least one vibrating device associated with at least one other axis are used as weighted temperature value.

11. The method of accelerometric and/or gyroscopic and/or gyrometric measurement in several axes as claimed in claim 10, characterized in that all the vibrating resonators of the accelerometric and/or gyroscopic and/or gyrometric devices are machined from one and the same block of crystal.

12. The method as claimed in claim 1, characterized in that the magnitude representative of the temperature in proximity to the device having two vibrating resonators is the temperature ($T_{mes}$) itself which is measured (at 15) in proximity to the device having two vibrating resonators, and in that with the aid of the transfer function H previously established (at 16), an estimated value $T_{estimated}=H(T_{mes})$ of the temperature of the vibrating resonators is determined (at 17) on the basis of the measured value ($T_{mes}$).

13. The method as claimed in claim 12, characterized in that the temperature ($T_{mes}$) is measured outside a box of the device that encloses the two vibrating resonators.

14. The method as claimed in claim 12, characterized in that the temperature ($T_{mes}$) is measured inside a box of the device that encloses the two vibrating resonators.

15. The method as claimed in claim 10, characterized in that one at least of the vibrating devices has a resonant frequency that varies linearly as a function of temperature and in that it is this linearly temperature dependent frequency that is measured and used as magnitude representative of the temperature.

* * * * *